No. 790,441. PATENTED MAY 23, 1905.
LE GRAND KNIFFEN.
MANURE SPREADER.
APPLICATION FILED JAN. 29, 1903.
2 SHEETS—SHEET 1.
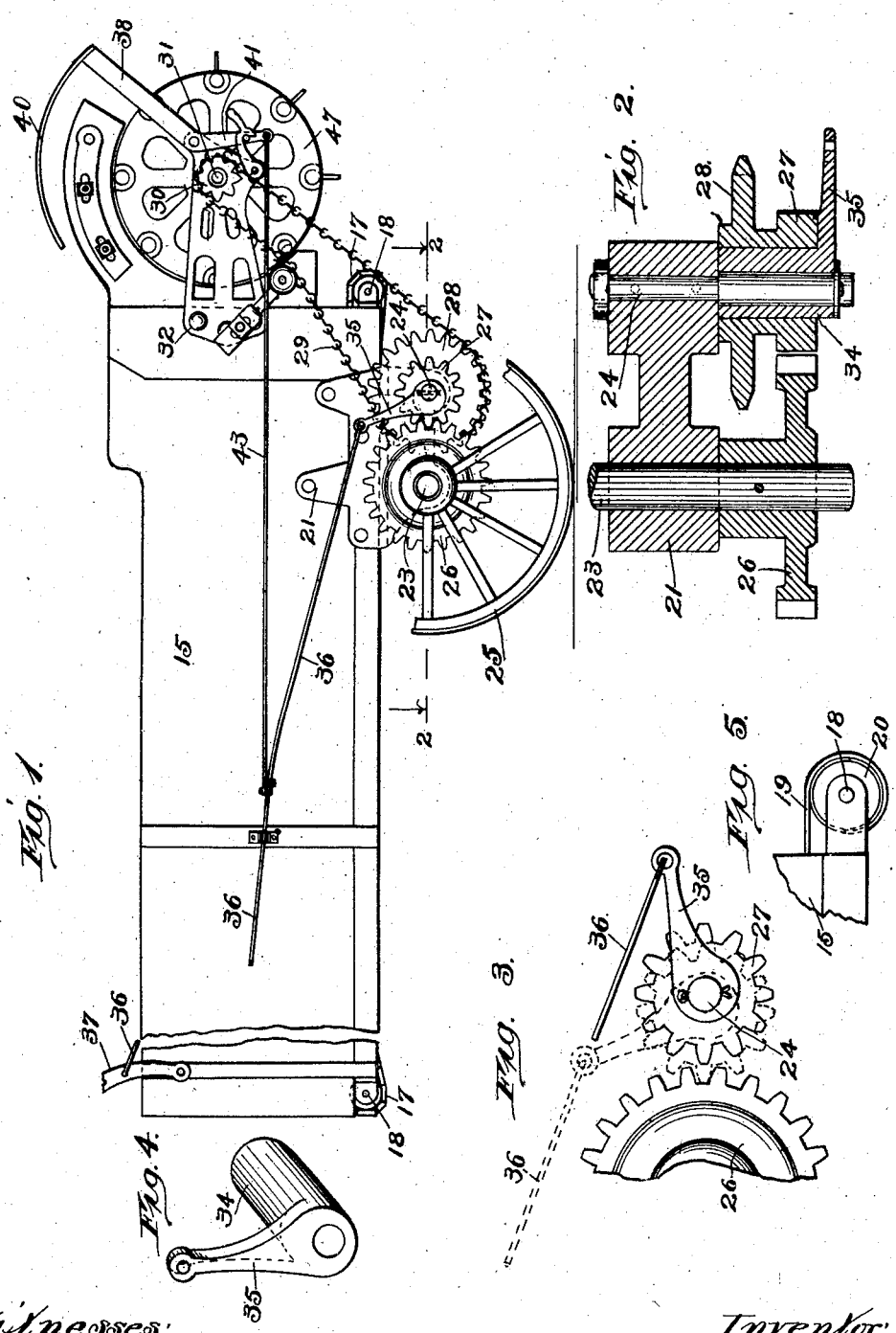

No. 790,441. PATENTED MAY 23, 1905.
LE GRAND KNIFFEN.
MANURE SPREADER.
APPLICATION FILED JAN. 29, 1903.
2 SHEETS—SHEET 2.
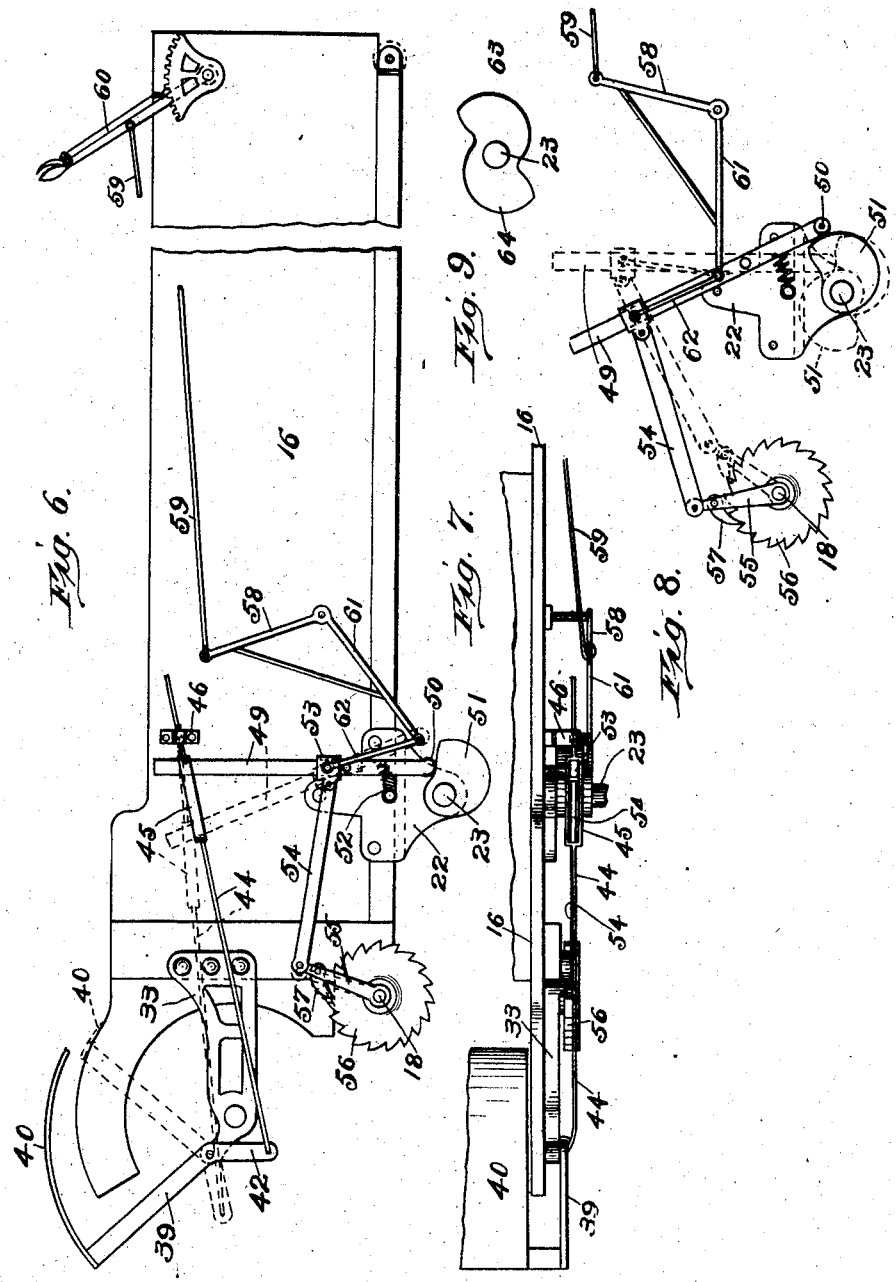

No. 790,441.

Patented May 23, 1905.

UNITED STATES PATENT OFFICE.

LE GRAND KNIFFEN, OF CHICAGO, ILLINOIS.

MANURE-SPREADER.

SPECIFICATION forming part of Letters Patent No. 790,441, dated May 23, 1905.

Application filed January 29, 1903. Serial No. 140,993.

*To all whom it may concern:*

Be it known that I, LE GRAND KNIFFEN, a citizen of the United States, residing at Chicago, in the county of Cook and State of Illinois, have invented certain new and useful Improvements in Manure-Spreaders, of which the following is a specification.

This invention relates to that type of manure-spreaders or fertilizer-distributers which carries at the rear end of a wagon-body a rotary beater provided with spikes to discharge the load as it is carried rearwardly by a suitable conveyer located at the bottom of the box or body and operated by the rotation of the traction-wheels, and has especial relation to the construction and means for operating the gearing and feeding mechanism or device for driving the conveyer; and it consists in the novel construction, combination, and arrangement of some of the most essential parts of the machine whereby the objects stated below will be attained, all as hereinafter described, and specifically set forth in the claims.

The necessarily-limited space between the traction or driving wheels and the body renders it difficult to place means on the axle of the driving-wheels to throw the machine out of gear without widening the tread of the machine to an undesirable extent.

The main objects of my present invention, therefore, are to provide a manure-spreader which shall be so constructed without widening its tread that all of its gearing can be thrown out of gear and so maintained before and while the machine is being driven to the field with a load as well as when it is returned unloaded, thus avoiding all wear and friction of the movable parts except that of the traction-wheels and when the machine is actually engaged in spreading manure; to furnish a manure-spreader in which the feeding mechanism or the device for driving the conveyer shall be so constructed as to give to the conveyer as nearly as possible a constant or continuous movement, but at the same time so made that the rate of feed or distribution of the load may be regulated at all times without stopping the machine, thus enabling the operator to spread the manure thickly or thin, according to the nature or requirements of the ground over which the machine is driven, and to so construct the machine that the lowering of the rotatable shield, (such as is shown in Patent No. 687,935, issued to me on December 3, 1901,) so as to form a rear endgate, will simultaneously and instantly throw both the gears that operate the beater and the feed-driving mechanism out of gear, and the raising of said shield, so as to form a wind-break, will throw said gears and feeding mechanism into gear at the same time.

In order to enable others skilled in the art to which my invention pertains to make and use the same, I will now proceed to describe it, referring to the accompanying drawings, in which—

Figure 1 is a view in side elevation of a portion of a manure-spreader, showing the gear for driving the beater-shaft and means for throwing it in and out of gear, as well as raising and lowering the combined rear endgate and shield. Fig. 2 is an enlarged sectional view taken on line 2 2 of Fig. 1 looking in the direction indicated by the arrows, showing the hanger or bracket for one end of the rear or driving axle of the machine and the stub-shaft for an eccentrically-mounted sprocket-wheel and pinion, and illustrating the main gear mounted on the rear axle and the said sprocket-wheel and pinion mounted on the stub-shaft. Fig. 3 is a fragmental view of the main gear and of the eccentrically-mounted pinion, showing them by dotted lines in engagement and by continuous lines out of gear. Fig. 4 is a detached perspective view of the eccentric sleeve, on which the main sprocket-wheel and pinion is mounted. Fig. 5 is a detail view, in elevation, of a portion of the body of the manure-spreader, showing a modified form of the conveyer at its bottom. Fig. 6 is a view in elevation of the opposite side of the manure-spreader from that shown in Fig. 1 and illustrating the feed-driving mechanism or device for operating the conveyer. Fig. 7 is a plan view thereof. Fig. 8 is a detached view of the feed-driving mechanism, showing by dotted lines the different positions its parts will assume and the means for adjusting the parts so as to cause the manure to be delivered more rapidly than when arranged as shown in Fig. 6; and Fig. 9 is a detached view showing a modification in the construction of the cam used in the operation of the feed-driving mechanism.

Like numerals of reference refer to corresponding parts throughout the different views of the drawings.

The numerals 15 and 16 represent the sides of the box or body, which may be of the ordinary construction and any suitable size and has at its bottom a rearwardly-traveling conveyer for the purpose of carrying the manure to the beater, by means of which it is discharged and cast upon the ground. The conveyer may be of any well-known kind; but in Fig. 1 of the drawings I have shown a conveyer 17 of the endless type, which is mounted on shafts 18, one of which is journaled at or near each end of the body. Instead, however, of employing an endless conveyer I may use a flexible one, 19, which may have one of its ends secured to a suitable roller 20, mounted on the shaft 18 at the rear end of the body and on which the said flexible conveyer may be wound, as will be readily understood by reference to Fig. 5 of the drawings. When such a conveyer is employed, it may be returned to its initial position by means of a crank on the end of a shaft 18, located at the front of the body and across the same, to which the front portion of the conveyer may be secured when it is apparent that while being unwound from one roller it will be wound on the other. Secured to the sides of the body, near their rear ends, are brackets or hangers 21 and 22, in which the rear or driving axle 23 is journaled. The bracket or hanger 21 is secured to that side 15 of the body on which the gear for driving the beater is mounted and has rigidly fixed in a portion thereof a stub-shaft 24, on which the main sprocket-wheel and its pinion is mounted. Mounted on the rear or driving axle 23 between one of the rear wheels 25 and the body is a cogged gear 26, which meshes with the pinion 27 on the hub of the main sprocket-wheel 28, which sprocket-wheel is geared, by means of a chain 29, to a smaller sprocket-wheel 30, mounted on one end of the beater-shaft 31, which is journaled in suitable brackets 32 and 33, attached to the rear portion of the body and extending rearwardly therefrom. As is clearly shown in Fig. 2 of the drawings, the main sprocket-wheel 28 and its pinion 27 are mounted on an eccentric sleeve 34, which is journaled on the outer portion of the stub-shaft 24 and carries on its outer end an arm 35, to which one end of a rod 36 is connected, the other end of which rod is secured to a hand-lever 37, fulcrumed on the front portion of the body. Pivotally secured to the rear portion of the brackets 32 and 33 are the arms 38 and 39 of the rotary shield or rear end-gate 40, which arms are provided with extensions or cranks 41 and 42, respectively. To the lower end of the crank 41 is connected at one of its ends a rod 43, which is connected at its other end to the rod 36, as is clearly shown in Fig. 1 of the drawings. Secured at one of its ends to the lower end of the crank 42 is a rod 44, which has near its other end a longitudinally-elongated loop 45 to receive the upper portion of a vibrating lever, as will be presently explained. The forward end of the rod 44 passes through a strap 46, secured to the side 16 of the body or that side thereof opposite that on which the driving-gear for the beater 47 is journaled. Fulcrumed to the body near the bracket 22 is a vibrating lever 49, the upper end of which passes through the loop 45 of the rod 44, as shown in Fig. 6 of the drawings. The lower end of the lever 49 is preferably provided with a roller 50, which impinges a cam 51, mounted on the rear axle or driving-shaft. Secured at one of its ends to the bracket 22 is a spring 52, the other end of which is attached to the lever 49 between its fulcrum and the cam, which spring serves the double purpose of holding the lower end of the lever 49 in engagement with the cam and when contracted to form a cushion for the lever to prevent too abrupt movement thereof in the operation of the cam. Movably mounted on the lever 49 is a box 53, to which is secured at one of its ends a bar or rod 54, the other end of which is pivotally connected to a crank or arm 55 on the conveyer-shaft 18, on which shaft is mounted a ratchet-wheel 56, with which a pawl 57, pivotally secured to the crank or arm 55, engages. Fulcrumed to the side 16 of the body near the lever 49 is a bell-crank lever to the upper arm 58 of which is connected at one of its ends a rod 59, the other end of which is secured to a hand-lever 60, fulcrumed on the front portion of the body. The lower arm 61 of the bell-crank lever is connected to the box 53 by means of a link or rod 62, as shown.

In Figs. 6, 7, and 8 of the drawings I have shown a cam with a single projection mounted on the driving-shaft or rear axle 23; but I do not desire to be limited to such a construction, as I may employ a cam having a plurality of projections and for this purpose have shown in Fig. 9 a cam having two projections 63 and 64, by means of which a multiplication of the action of the lever 49 and its connections with the ratchet-wheel 56 will be obtained.

In using the mechanism shown in Figs. 6 to 8, inclusive, it is apparent that by moving the hand-lever 60 in the proper direction the box 53 will be raised or lowered on the lever 49, thus causing the movement of the conveyer to be regulated so as to distribute the manure as required.

By throwing the hand-lever 37 rearwardly it is evident that the shield 40 will be lowered so as to form a rear end-gate, in which operation the eccentric sleeve 34 will be turned on its shaft by reason of its connection with the hand-lever, thus throwing the pinion 27 out of mesh with the main gear 26 on the rear axle. At the same time this is done the rod 44, which is connected to the crank 42 of the rotary shield, will be retracted, and as the vibrating lever 49 passes through the loop 45 of said rod the said lever will be moved to the position indicated by dotted lines in Fig. 6, so as to be out of engagement with the cam on the rear axle, thus throwing the driving mechanism for the conveyer out of gear. When the shield is raised to the position shown by continuous lines in Figs. 1 and 6, so as to furnish a wind-break to prevent the particles or manure being scattered, (by the wind,) it is evident that the feed mechanism or device for driving the conveyer, as well as the gear for rotating the beater, will be thrown into gear.

Having thus fully described my invention, what I claim as new, and desire to secure by Letters Patent, is—

1. In a manure-spreader, the combination of the body, with a rearwardly-movable conveyer located at its bottom, a beater journaled at the rear end of the body, a shield pivotally secured at the rear end of the body, gearing located at one side of the body to rotate the beater, a hand-lever fulcrumed on the front portion of the side of the body on which said gearing is located, connections uniting the said lever, shield, and gearing, a mechanism located on the other side of the body to operate the conveyer, said mechanism comprising a conveyer-shaft, a ratchet-wheel on said shaft, a crank on said shaft provided with a pawl to engage the ratchet-wheel, a vibrating lever fulcrumed on the body, a bar connected at one of its ends to said crank and at its other end loosely to the lever, a cam journaled on the body and adapted to impinge the lower end of the lever so as to impart vibratory motion thereto, a hand-lever fulcrumed on the front portion of the side of the body on which the conveyer-operating mechanism is located, and connections uniting the said hand-lever, vibrating lever, and shield, substantially as described.

2. In a manure-spreader, the combination with the body, of a rear axle journaled thereon, a conveyer-shaft transversely journaled at the rear end of the body, a conveyer mounted thereon, a ratchet-wheel on the conveyer-shaft, a crank on said shaft provided with a pawl to engage the ratchet-wheel, a vibrating lever fulcrumed on the body, a bar connected at one of its ends to said crank and at its other end loosely to the lever, a cam fixed on the rear axle so as to impinge the lower end of the lever and to impart vibratory motion thereto, substantially as described.

3. In a manure-spreader, the combination with the body, of a rear axle journaled thereon, a conveyer-shaft transversely journaled at the rear end of the body, a conveyer mounted thereon, a ratchet-wheel on the conveyer-shaft, a crank on said shaft provided with a pawl to engage the ratchet-wheel, a vibrating lever fulcrumed on the body, a bar movably connected at one of its ends to the lever and at its other end to said crank, a bell-crank lever fulcrumed on the body, a rod connecting the lower arm of the bell-crank lever and the movable end of said bar, a hand-lever fulcrumed on the front portion of the body, a rod connecting the hand-lever and the upper arm of the bell-crank lever, a cam on the rear axle to impinge the lower end of the vibrating lever so as to impart vibratory motion thereto, substantially as described.

4. In a manure-spreader, the combination with the body, of a rear axle journaled thereon, a conveyer-shaft transversely journaled at the rear end of the body, a conveyer mounted thereon, a ratchet-wheel on the conveyer-shaft, a crank on said shaft provided with a pawl to engage the ratchet-wheel, a vibrating lever fulcrumed on the body, a bar movably connected at one of its ends to said lever and at its other end to the crank, a shield pivotally secured at the rear end of the body, a crank connected to said shield, a rod secured at one of its ends to said crank and loosely supported at its other end on the body and provided near the last-named end with a loop to receive the upper end of the vibrating lever, means on the rear axle to impart vibratory motion to the vibrating lever, and means to rotate the shield whereby when it is lowered the vibrating lever will be thrown out of gear with the operating means therefor on the rear axle, substantially as described.

5. In a manure-spreader, the combination with the body, of a rear axle journaled thereon, a conveyer-shaft transversely journaled at the rear end of the body, a conveyer mounted thereon, a ratchet-wheel on the conveyer-shaft, a crank on said shaft provided with a pawl to engage the ratchet-wheel, a vibrating lever fulcrumed on the body, a spring secured at one of its ends to the lower portion of said lever and at its other end on the body, a bar movably connected at one of its ends to said lever and at its other end to the crank, a bell-crank lever fulcrumed on the body, a connection uniting the movable end of said bar and the lower arm of the bell-crank lever, a hand-lever fulcrumed on the front portion of the body, a rod connecting said lever and the upper arm of the bell-crank lever, a shield pivotally secured at the rear end of the body, a crank at each end of the shield, a rod secured at one of its ends to the crank on the side of the body adjacent to the vibrating lever, said rod being loosely supported on the body and having near its forward end a loop to receive the upper end of the vibrating lever, a hand-lever fulcrumed on the opposite side of the body from that on which the first-named hand-lever is located, a rod connecting the last-named hand-lever and the crank on the opposite end of the shield, and a cam mounted on the rear or driving shaft to impart vibratory motion to the vibrating lever, substantially as described.

6. In a manure-spreader, the combination with the body, of a rearwardly-movable conveyer located at its bottom, a beater journaled at the rear end of the body, a shield pivotally secured at the rear end of the body, a crank at each end of the shield to rotate the same, gearing located on one side of the body to rotate the beater, the said gearing comprising a gear mounted on the rear axle, a pinion and a sprocket-wheel eccentrically journaled near the rear axle, an arm to turn the said pinion and sprocket-wheel, a sprocket wheel on the beater-shaft and a sprocket-chain uniting said wheel and the eccentric sprocket-wheel, a mechanism located on the other side to operate the conveyer comprising a ratchet-wheel on the conveyer-shaft, a crank on said shaft provided with a pawl to engage the ratchet-wheel, a vibrating lever fulcrumed on the body, a bar movably connected at one of its ends to said lever and at its other end to the crank, means on the rear axle to impart vibratory motion to the vibrating lever, a rod secured at one of its ends to one of the cranks of the shield and provided near its other end with a loop receiving the upper end of the vibrating lever, a hand-lever fulcrumed on the side of the body on which the said gearing is located, a bifurcated rod connected at its front end to said hand-lever and having one of its prongs connected to one of the cranks of the shield, and its other prong to the arm for the eccentric pinion and eccentric sprocket-wheel, so that when the shield is lowered, the said gearing and mechanism will be thrown out of gear and when it is raised will be thrown into gear, substantially as described.

7. In a distributer, the combination with the body thereof carrying the relatively movable floor or carrier, of feed devices for operating the latter embodying an operative shaft, ratchet-and-pawl mechanism operatively connected to the movable floor for imparting motion thereto, an actuating device operated by the said shaft, an arm capable of being moved into and out of coöperative relation with said device and arranged to actuate the ratchet-and-pawl mechanism.

LE GRAND KNIFFEN.

Witnesses:
CHAS. C. TILLMAN,
A. GUSTAFSON.